(12) United States Patent
Lukkala et al.

(10) Patent No.: US 11,256,742 B2
(45) Date of Patent: Feb. 22, 2022

(54) AUTOMATED DOCUMENT MODIFICATION

(71) Applicant: Copla Oy, Helsinki (FI)

(72) Inventors: Saku Lukkala, Lepsämä (FI); Pekka Viiliainen, Vantaa (FI)

(73) Assignee: Copla Oy, Helsinki (FI)

( * ) Notice: Subject to any disclaimer, the term of this patent is extended or adjusted under 35 U.S.C. 154(b) by 580 days.

(21) Appl. No.: 16/090,644

(22) PCT Filed: Apr. 12, 2017

(86) PCT No.: PCT/FI2017/050267
§ 371 (c)(1),
(2) Date: Oct. 2, 2018

(87) PCT Pub. No.: WO2017/178706
PCT Pub. Date: Oct. 19, 2017

(65) Prior Publication Data
US 2020/0410162 A1    Dec. 31, 2020

(30) Foreign Application Priority Data

Apr. 15, 2016   (FI) ...................................... 20165327

(51) Int. Cl.
*G06F 16/84* (2019.01)
*G06F 16/23* (2019.01)
(Continued)

(52) U.S. Cl.
CPC .......... *G06F 16/86* (2019.01); *G06F 16/2379* (2019.01); *G06F 16/93* (2019.01); *G06F 40/186* (2020.01); *G06K 19/06028* (2013.01)

(58) Field of Classification Search
CPC .... G06F 40/186; G06F 16/93; G06F 16/2379; G06F 40/131; G06F 16/86; G06F 40/106;
(Continued)

(56) References Cited

U.S. PATENT DOCUMENTS 7,783,614 B2 * 8/2010 Jones .................... G06F 40/166
707/694
2012/0324350 A1   12/2012 Rosenblum et al.
(Continued)

FOREIGN PATENT DOCUMENTS

CN        1527226 A     9/2004
CN      101176052 A     5/2008
(Continued)

OTHER PUBLICATIONS

Plone, Database packing, https://web.archive.org/web/20151018035403/https://docs.plone.org/4/en/manage/deploying/packing.html, Oct. 18, 2015 (Year: 2015).*

(Continued)

*Primary Examiner* — Nicholas Ulrich
(74) *Attorney, Agent, or Firm* — Ziegler IP Law Group, LLC

(57) ABSTRACT

Method, computer program and apparatus, with which receiving from a user a subject selection of a document and a selection of document components from a set of available document components, and automatically: including the selected document components in the document; recognising a set of tags in the selected document components; maintaining the mapping of available tag types and database fields; for each recognised tag acquiring from a database dynamic data based on the subject, the tag, and mapping of the database fields, and combining at least a portion of the acquired dynamic data to the document at the tag; and indicating to the user modifiable parts of the document. Further, modification data is received from the user and saved to the user's modifiable parts.

20 Claims, 3 Drawing Sheets

(51) Int. Cl.
*G06F 16/93* (2019.01)
*G06F 40/186* (2020.01)
*G06K 19/06* (2006.01)

(58) Field of Classification Search
CPC ............ G06F 40/166; G06K 19/06037; G06K 19/06028; G06Q 10/103; G06Q 10/10
See application file for complete search history.

(56) References Cited

U.S. PATENT DOCUMENTS

| | | |
|---|---|---|
| 2013/0036348 A1 | 2/2013 | Hazard |
| 2014/0181643 A1* | 6/2014 | Hargarten ............... G06Q 30/04 715/234 |
| 2015/0039852 A1 | 2/2015 | Sen et al. |
| 2015/0052615 A1 | 2/2015 | Gault et al. |

FOREIGN PATENT DOCUMENTS

| | | |
|---|---|---|
| CN | 104239373 A | 12/2014 |
| EP | 1447754 A1 | 8/2004 |
| RU | 2323540 C2 | 4/2008 |
| WO | 2006115718 A2 | 12/2007 |
| WO | 2014206151 A1 | 12/2014 |

OTHER PUBLICATIONS

International Search Report, Application No. PCT/FI2017/050267 dated Aug. 17, 2017, 5 pages.
Written Opinion of International Searching Authority, Application No. PCT/FI2017/050267 dated Aug. 17, 2017, 9 pages.
China Patent Office, Search Report, Application No. 2017800225419, dated Sep. 26, 2021, 3 pages.

* cited by examiner

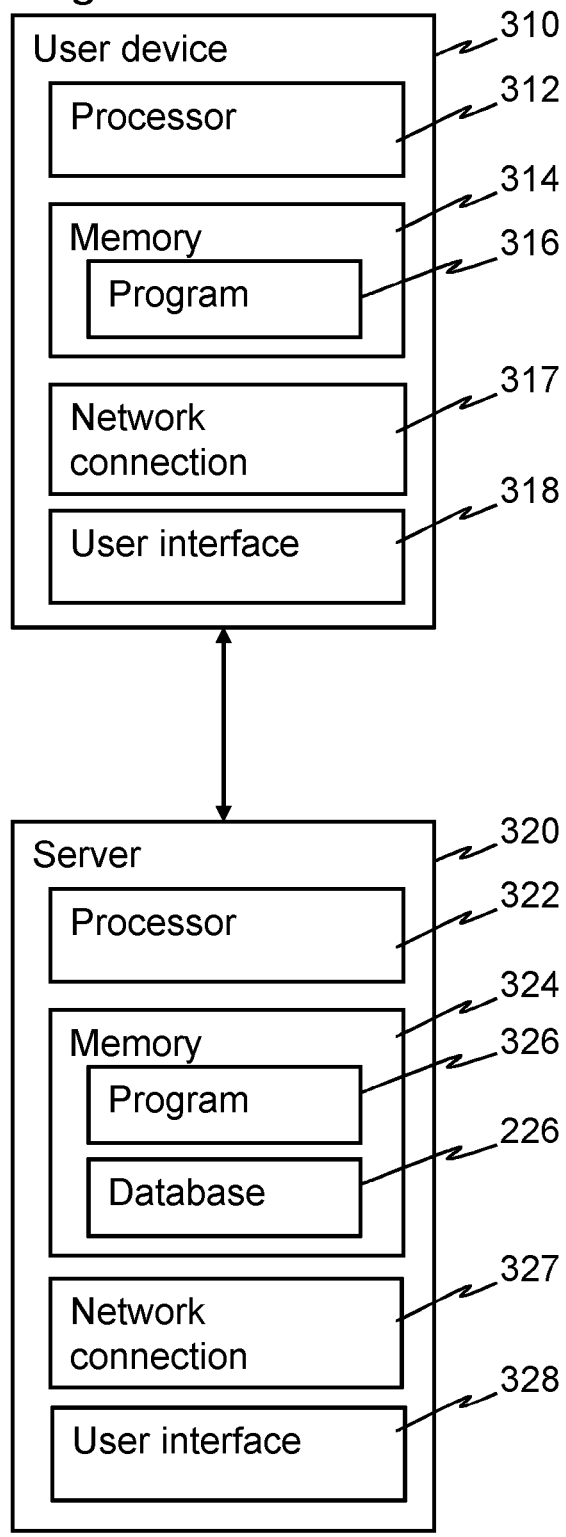

AUTOMATED DOCUMENT MODIFICATION

TECHNICAL FIELD

The disclosure relates to document automation.

BACKGROUND ART

This section illustrates useful background information for the reader without admission of any technique described herein necessarily representing the state of the art.

Automaton has helped to faster and more precisely control, adjust and produce things within a wide range of different fields from manufacturing to office work. For example, typewriters and various materials for error correction, such as correction fluid, have practically vanished with word processor software and printers.

In office work, especially reuse of text and graphics a limitless amount of times without deterioration of quality is facilitated by automation. Template documents are especially designed to help to produce at once predetermined settings and static text. Additionally, static and dynamic text can comfortably be combined using a so called mail merge technique using fields taken from a database. This was probably first used in mass delivery for letters and address stickers of envelopes using saved contact information so that numerous documents could be printed at once without forming for each letter to be sent an own document.

When automation is used in office work, tiresome and boring work is done faster and more precisely with a computer and productivity rises. In some automation, simply, the computer does work previously done with pen and paper so that the automation does not require or produce a new process that would have been even impossible before automation, or the automation can only generate something that is recognisable by the human mind only. Respectively, automation that creates a non-obvious improvement to a process via its inventive implementation exceeds mere mental activity.

The aim of this disclosure is to further develop document automation with a novel technical computer application for solving various problems relating to the state of the art.

SUMMARY

According to a first aspect of this disclosure there is provided a method comprising:
receiving from a user a selection of a subject of a document;
  receiving from the user a selection of document components from a set of available document components and automatically:
  including the selected document components in the document;
  recognising a set of tags in the selected document components; maintaining a mapping of available tag types and database fields; for each recognised tag acquiring from a database dynamic data based on the subject, the tag and the mapping of the database fields and combining at least a portion of the acquired dynamic data to the document at the tag; and indicating to the user modifiable components of the document;
  wherein the method further comprises:
  receiving from the user modification data and saving the modification data to the parts modifiable by the user.
Preferably, the user may be allowed to select the document components and then the document may be created to include the selected document components and associated dynamic information, i.e. the content may be automatically filled from the database using tags stored in the document components so that the document being created includes the components selected by the user and in those current and correct dynamic content. Further, preferably the user may finalise the formed document by adding any desired modification data into the modifiable parts of the document.

Including the document components in the document may be performed prior to combining the acquired dynamic information at the tags.

Combining the document components to form the document may be performed after combing the acquired dynamic information at the tags.

Combining document components to form a document may be performed after combing at the tags the acquired dynamic information.

The method may comprise maintaining the document unchanged when the database changes. Changes of the database may be updated into the document by a command from the user. By maintaining the document unchanged when the database changes unintentional changing of the content of the document may be avoided.

The method may comprise updating the document by updating the dynamic data at the tags. Preferably, changes of the database may be mirrored to the document without the user having to give again the same selections and data.

The database may be a business application database. The database may be a project planning database. The database may be an ERP (enterprise resource planning) database. The database may define the needed materials and work phases. Preferably, the document may be produced to include only such parts that are relevant for a certain project as defined in the subject. To the document, parts relevant to that project may be included and they may be automatically completed with correct and current data from the business application database. The database may consist of one or more text documents, spreadsheet workbooks or other data storages. The database may be a structured query language database with which dynamic data may be space efficiently stored and acquired to be combined at the tags in the document. Through the SQL-base dynamic data, according to different tags and to be combined to the document, may particularly efficiently be recognised from the database based on the linking.

The database may be packed to reduce the storing space needed. The document may be packed to reduce the storing space needed.

The method may comprise acquiring several dynamic data alternatives for one tag; allowing the user to select one or more of said dynamic data alternatives; and combining the one or more dynamic data alternatives to the document at the tag.

Preferably, automatic formation of the document or updating based on dynamic data stored in the database may be performed in a moment with the method so that while the user is waiting correct dynamic data is promptly acquired from the database to the correct parts of the document being formed and when necessary giving the selection of alternative data as a task to the user so that hundreds and thousands data may be handled without delay. A particularly efficient technical arrangement is created through the method e.g. for formation and/or updating of technical documents. The method may decrease the amount of the user's actions required to form documents and so decrease error possibility, the user's ergonomic load and improve the reliability of document formation. The method may also decrease versioning needed for correcting documents and storing and save storage and data transfer capacity so that for the same document production less computing ability and energy is needed.

A tag may be metadata associated to a component of the document. The method may comprise the user forming one or more tags. The tag may comprise a definition of dynamic data associated with it. The definition of dynamic data may comprise an identifier of the type of the dynamic data, such as an address identifier. Forming the tag may comprise presenting alternatives available based on the subject and/or the database and the user selecting from them the alternative she desires. A tag relating to same dynamic data may be at more than one spot of one document component and/or in two or more different document components.

The method may further comprise defining general properties of the document and selecting a document template for correspondingly defining various attributes. The document components may be formatted according to the selected document template before or after including the document components in the document or during the including. The template may define the orientation, the styles and the layout of the document.

The method may comprise allowing the user to add as a document component content selected by the user from another source than the other document components. Content selected by the user may be added by taking an image, video and/or recording audio signal. The content selected by the user and to be added may be added as one or more supplement components. The supplement component does not necessarily include any tags. Optionally or additionally, the content selected by the user and to be added may be added as one or more document components.

The subject may define a customer to whom the document should relate. The subject may define a certain project of the defined customer. The method may comprise automatically preselecting predefined document components based on the subject from said set of available document components. The user may be allowed to remove the selection of preselected document components to form a part of the document before or after including the selected document components in the document.

Content may be added to the document from files of different document types. Document components of different document types may be included in the document.

The document type of the supplement component may differ from the document type of the document. The document type of the supplementary component may differ from the document type of at least one document component.

The document type may be a word processor document. The document type may be a spreadsheet document. The document type may be a standardised document type, such as an open document format, an XML or portable document format (e.g. version 1.4, 1.5, 1.6, 1.7 or some other version). The document type may be an application specific document type, such as Microsoft Word™ (2013) document type or Autodesk AutoCAD™ document type. The document type of the document components and of possible supplementary components may be the same, but the version may differ from each other.

The subject may define the classification of the document. The classification of the document may be a classification by subject. The subject may define the typing of the document. The subject may define a storing location of the document.

The document may comprise a unique identifier. The identifier may comprise one or more of the following or any combination of any parts thereof: a barcode, a QR code, a definition of an RFID (Radio Frequency Identification) identifier, text, digits, an alphanumerical identifier. The definition of the RFID identifier may enable printing the RFID identifier as a part of the print of the document.

The method may comprise recognising or imaging notes made in the document e.g. by marking with a pen on a paper print; recognising the identifier of the document; and updating the document to comprise said notes.

According to a second aspect of this disclosure there is provided a computer program comprising program code executable on a computer that, when executed on a computer, achieves a device to execute the method according to the first aspect. The computer may be capable of executing also other functions. The computer may be a cell phone, a tablet computer, a navigation device, a game device, a media player and/or a portable or fixed smart device.

According to a third aspect of this disclosure there is provided an apparatus comprising a memory, a program code stored in the memory and a processor, that is adapted to, when executing the program code, to execute the method according to the first aspect of the invention.

The apparatus may be a decentralised apparatus in regard of one or more parts. The apparatus may be virtualised. The apparatus may be an apparatus implemented with a cloud service.

Different embodiments of the present disclosure will be described or have been described only in connection with one or some aspects. The person skilled in the art appreciates that an embodiment of any aspect can be applied alone or as a combination of other embodiments in the same aspect or in other aspects of the invention.

BRIEF DESCRIPTION OF THE DRAWINGS

The invention will now be described by way of example with reference to the accompanying drawings, in which:

FIG. 3 shows a block diagram of an apparatus according to an embodiment of this disclosure.

DETAILED DESCRIPTION

In the following description, like reference signs denote like elements or steps. It should be noted that the presented figures are not in scale in their entirety, and that they mostly serve the purpose of merely illustrating embodiments of this disclosure.

According to a first aspect of the invention there is provided a method comprising:
  receiving from a user a selection of a subject of a document, 110;
  receiving from the user a selection of document components from a set of available document components and automatically, 120:
    including the selected document components in the document, 130;
    recognising a set of tags in the selected document components, 140;
    maintaining a mapping of available tag types and database fields 150;
    for each recognised tag acquiring from a database dynamic data based on the subject, the tag and the mapping of the database fields and combining at least a portion of the acquired dynamic data to the document at the tag, 160; and indicating to the user modifiable parts of the document; wherein the method further comprises, 170:

receiving from the user modification data and saving the modification data to the modifiable parts of the document, 180.

Figure 1:
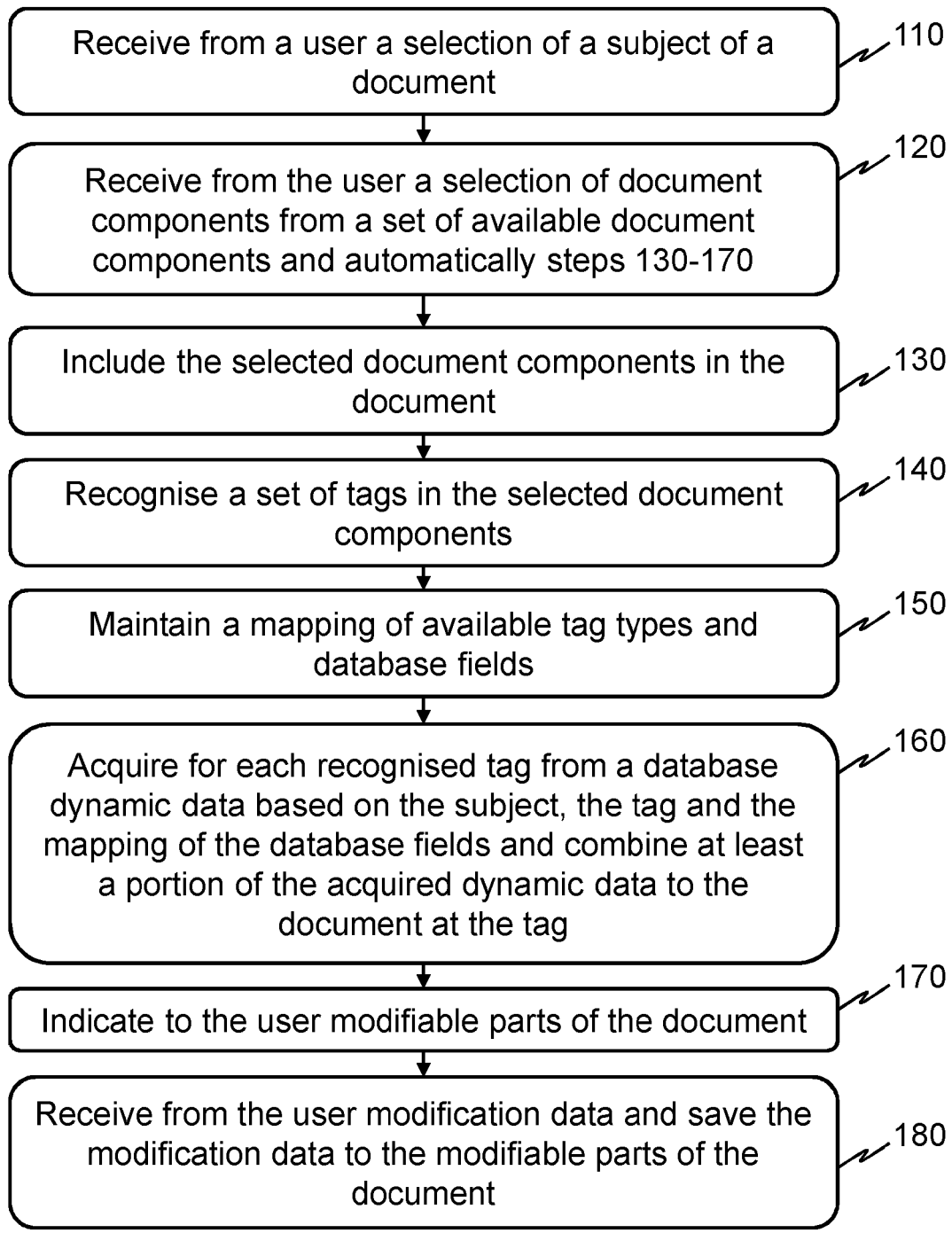
FIG. 1 shows a diagram of a process according to an embodiment of this disclosure.
Figure 2:
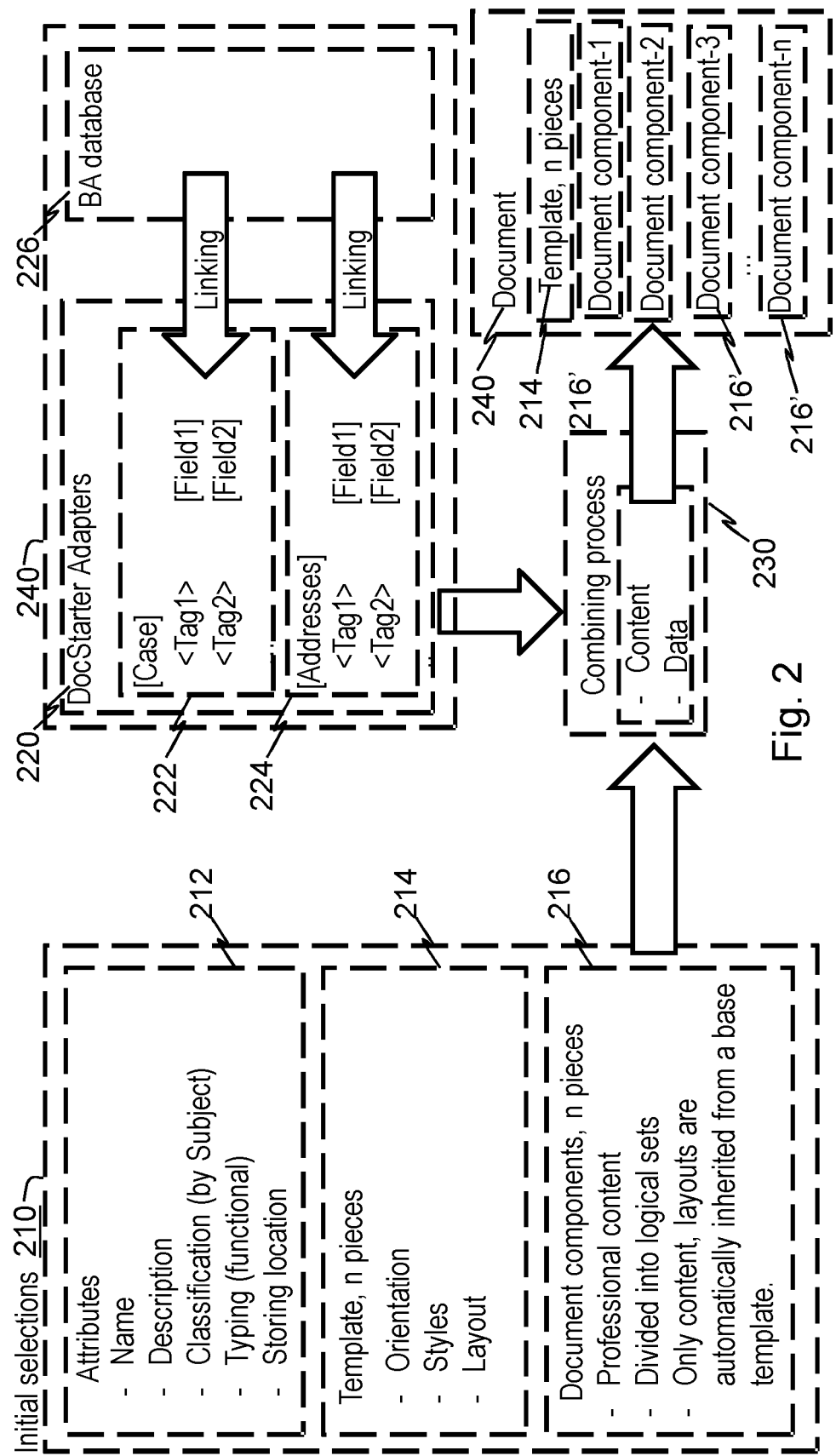
FIG. 2 shows a diagram of a process according to an embodiment of this disclosure.

FIG. 2 presents a diagram of a process according to an embodiment of this disclosure, with which the method of FIG. 1 can be implemented. Initial selections 210, including the subject and/or the attributes 212, possibly one or more templates 214, (e.g. created by the user or modifiable), and the document components 216, of which there are n pieces (n>1, in special cases n can be 1) are drawn into FIG. 2. The document components include tags that define predeterminingly specific portions of the document components and the type of dynamic data linkable thereto. The initial selections 210 are given as an input to the combining process of the dynamic data, possibly comprising the user to the selection process. In the combining process 230 dynamic data 226 is combined at the tags. In the possible selection process, according to additional selections made by the user, one or more of alternative dynamic data provided at the tag is selected, if one or more dynamic data are provided. The dynamic data is obtained from a dynamic data combining apparatus 220 comprising a document formation adapter or adapters (depending on the implementation, one or more parts) being adapted to maintain the mapping of different tags and database fields for linking dynamic data. The adapter or adapters are drawn in FIG. 2 to comprise a case portion "case" 222 adapted to link corresponding data from the database 226, that is e.g. an ERP database or another business application database, at tags regarding a certain case, such as a project. The adapter or adapters are drawn in FIG. 2 to further comprise an address portion 224 adapted to link corresponding dynamic data from the database 226 at tags regarding address data. This is how the adapters produce dynamic data 226 to a document component 216. A document formed in this manner can be saved to its desired storing location, which may be defined according to or based on the attributes 212. Updated, the document 240 may as such comprise the same document components as before combining dynamic data 226 but the document components being equipped with dynamic data indicated to them by the tags. The updated document 240 may also include internal updatable content of the document, such as a table of contents, which may be updated as a part of combining dynamic data or after it.

In FIGS. 1 and 2, the user may select the desired document components 216 to the document 240. The document 240 may be created to include selected document components 216 and associated dynamic data 226 may be combined to it i.e. the content may be automatically filled from the database 226 using tags stored in the document components 216 so that the created document comprises the parts selected by the user i.e. the document components 216 and in those the current and correct dynamic data. Additionally, preferably the user may finalise the formed document by adding any desired modification data to the modifiable parts of the document.

In addition to the above described document components 216 the user may be allowed to select to the document 240 another document component or supplementary component, such as e.g. a document available to the user from another source. The supplementary component may be, for example, an image, a video recording, or a sound recording. By adding a supplementary component the user may easily add useful additional data to the document 240. The supplementary component needs not comprise any tags for combining dynamic data. Optionally, the user may be allowed to add one or more tags to the supplementary component.

The document 240 may be updated with regard to the dynamic data, for example, by reusing the document for linking dynamic data in the combining process 230.

The document 240 may be updated by changing components included in it. If one or more document components are added to the document, the combining process 230 may be performed again. Changing the document may comprise performing again steps 120 to 180.

The document 240 may be updated in regard to its layout by amending the template defining the document.

The document 240 may comprise more than one templates. The first template may inherit defining elements from another template so that an amendment in the other template affects the first template.

The document 240 may be a document modifiable in a word processing program. The document 240 may be a document modifiable in a spread sheet program.

The dynamic data comprised in the document 240 may be protected to avoid changes made by the user. The dynamic data may be cryptographically protected. A key of the cryptographic protection may be hidden in the document. The key of the cryptographic protection may be stored in the database 226. The combining process 230 may comprise acquiring the cryptographic key and removing or bypassing the protection of the document during linking of dynamic data. Optionally, in the initial selections 210 the document components entering the combining process 230 may be unprotected and the dynamic data may be protected in connection with the combining process. The combining process may hide the key used for the protection in the document. The key may be hidden as a field code in connection with the tag.

The tag may be metadata associated to a document component, such as a freely selected name of a table or an identifier inputted with a field code. The tag may comprise opening and ending notations, the part between which is data related to the tag. In some cases the user may herself form one or more tags. The tag may comprise the definition of dynamic data combinable to it, which may comprise an identifier of the type of the dynamic data, such as a mailing address or an identifier of the name of the subject. Forming the tag may comprise presenting to the user the available options based on the subject and/or database, and the user selecting from them the option she desires. In connection with this, dynamic data corresponding to said option may be shown to the user for previewing, whereby in connections with the formation of tags a portion of the combining of dynamic data may already be performed. A tag regarding same dynamic data may be in more than one spot of one document component and/or in two different document components.

In some embodiments dynamic data may be written on a tag or when the dynamic data has been combined at the tag, the tag may be removed as a part of the combining process or after the combining process. If the tags are retained, they may be used later for updating dynamic data.

The subject may define the classification of the document. The classification of the document may be a classification by subject. The subject may define the typing of the document. The document may be classified into service packages based on business factors defined by the user. Through classification, the user may easier find documents belonging to said service. The user may define as a document type e.g. a memorandum, an agenda, a summary, a leaflet, a complaint, a listing. A document component may be e.g. a cover page, a table of contents, a job description of a sub process, a project schedule, a catalogue of needed human resources, or a catalogue of needed materials.

The subject may define the storing location of the document. The subject may define the storing location of the document according to a rule defined by the administrator. Optionally, the administrator may define beforehand for each project a certain storing location and based on the subject a storing location defined for the corresponding project may be selected and this storing location may be used as the storing location of the document being formed.

FIG. 3 presents a block diagram of an apparatus 300 according to an embodiment of the invention. The apparatus 300 comprises the user device 310 and a server 320. The user device is, for example, a laptop, a PC, a tablet computer, a mobile phone, or another information processing device. The server 320 is, for example, a dedicated server, a network server, a virtual server, or a server implemented in a cloud service. The user device comprises a processor 312, a memory 314, a computer program 316, which comprises program code implemented on the processor for controlling the user device 310, a network connection circuit 317, and a user interface 318 for presenting data to the user and for receiving data from the user using, for example, a screen, a printer, a loudspeaker, speech synthesis, a keyboard, a microphone, speech recognition, and/or a computer mouse. The network circuit 315 may comprise a local area network (LAN) and/or a wide area network (WAN, such as 3G or 4G mobile data circuit).

The server 320 comprises a processor 322, a memory 324, a computer program 326 stored in the memory 324 and a database 226, which comprises program code implemented on the processor for controlling the user device 320, a network connection circuit 327, and possibly a user interface 328 for presenting data to the operator of the server and for receiving data from the operator of the server using e.g. a screen, a printer, a loudspeaker, speech synthesis, a keyboard, a microphone, speech recognition, and/or a computer mouse. The network connection circuit 325 may comprise a local area network (LAN) and/or a wide area network (WAN, such as 3G or 4G mobile data circuit).

The memory 324 comprises preferably a working memory, such as RAM memory, and a non-disappearing memory, such as a hard disc, an SSD (solid state data) memory, program code implemented from which is preferably in the working memory during operation of the server. The database or a portion of it may be stored during the operation of the server in the working memory. The database may be compressed, i.e. packed, to save memory space. The database may be cryptographically encrypted. Different parts of the database may be encrypted with different algorithms and/or encryption keys. When the database is used for combining dynamic data the encryption keys of the needed portions may be acquired for the device performing the combining. Acquiring the encryption keys may comprise checking rights of the user.

The use of various portions of the database may require rights of different levels and the rights of the user to use the needed data of the database may be checked e.g. in connection with the combining process. Optionally or additionally, a definition of user rights may be set for the document components, based on which the rights of the user to include in the document to be formed data restricted to a certain user group may be checked already when selecting document components. In an embodiment, the rights of the user are checked in connection with step 110 or 120 when the user is giving data needed for forming the document. The rights of the user may also be checked when possibly updating the document. The storing address of the document may be formed so that the formed document will only be available from there to persons who have allowed access to the data included in the document.

When creating or editing the document identity of the user and access rights may be checked. The identity of the user and/or a derivative formed from the identity of the user proving who created the document may be embedded into the document. Corresponding data or derivative of the identity of the updater of the document may be embedded into the document. The derivative may be a cryptographic one-way hash code, which's initial parameters comprise at least a portion of the identity of the user. At least a portion of the subject of the document and/or time stamp and/or valuation or running code may serve as initial parameters. The identity of the user may comprise at least partially any of the following: name of the user; person number of the user; username of the user; a biometric feature of the user, such as a finger print, voice, an identifier derived from a facial image or a retinal image; or a derivative of any of these, such as a cryptographic one-way hash code.

The combining process may be performed on the server 320. For the combining process, the user device may be arranged to deliver the initial selections 210 or an indication of the initial selections to the processor 320. The server 320 arranged to buffer a part or parts of the database 226 to accelerate the combining process. The server 320 may be arranged to update the buffered part of the database when the user starts to define initial selections 210.

The combining process may be performed with the user device 310. The user device 310 may be arranged to buffer a portion of the data of the database for the combining process. The user device 310 arranged to buffer or update the buffered portion of the database, when the user starts to define the initial selections 210.

The user device may be arranged to allow editing of the formed document 240 by supplementing or otherwise modifying the document 240. The user device may be arranged to share electronically the document with one or more other users. The document 240 may be shared by sending a copy thereof or a link to the storing location of the document.

The server 326 may be arranged to store passwords or access to passwords may be arranged for the server 326 e.g. for using or opening document components and/or the business application database.

The description presented in the foregoing provides non-limiting examples of some embodiments of the invention. A person skilled in the art appreciates that the invention is, however, not restricted to the presented details, but that the invention may also be implemented in other equivalent manners. For example, on creating the document, more than one document may be created e.g. based on the subject selection of the document. A portion of the more than one documents being formed may be formed to include a document component or parts deviating from the other documents. E.g. more than one document may be created at once, e.g. both a question form and an answer form or, say, when creating a document referring to some steps of a construction project, own documents may be produced at the same time for the contractor, the subcontractor, and the construction control. To different documents e.g. referring to the same project phase relevant, correct and current data for said documents may be automatically collected avoiding unintentionally sharing data that is incorrect, or data that is unnecessary or confidential not belong to said document. By forming several documents as a single process based on the subject selection given by the user, producing all the needed documents may be accelerated.

Significant technical effects and advantages may be achieved with different embodiments of the invention, such as: standardised document layout through few basic models; standardised document content by using centrally administered content elements; standardised document storing to default locations according to data of the document and of the business case; decreasing error possibilities when processing changing data; decreasing the work and defining done by the user for creating documents through selectable document components; and accelerating formation of documents and decreasing the needed processor work and energy consumption and the loading of communication channels.

Some of the features of the disclosed embodiments may be used to advantage without the use of other features. As such, the foregoing description shall be considered as merely illustrative of the principles of this disclosure, and not in limitation of the disclosure. Hence, the scope of the disclosure is only restricted by the appended patent claims.

The invention claimed is:

1. A method comprising:
   receiving from a user a selection of a subject of a document;
   automatically selecting predefined document components based on the subject from a set of available document components;
   receiving from the user a selection of a plurality of document components from the set of available document components and automatically:
      including in the document the automatically selected document components and the plurality of document components selected by the user;
      recognising a set of tags in the automatically selected document components and in the plurality of document components selected by the user;
      maintaining a mapping of available tag types and database fields;
      for each recognised tag acquiring from a database dynamic data based on the subject, the tag and the mapping of the database fields and combining at least a portion of the acquired dynamic data to the document at the tag; and
      saving the document to a desired storage location.

2. The method of claim 1, wherein the method comprises maintaining the document unchanged when the database changes.

3. The method of claim 2, wherein the method comprises updating changes of the database into the document by a command from the user.

4. The method of claim 2, wherein the database is an SQL database.

5. The method of claim 1, wherein the database is a business application database.

6. The method of claim 1, wherein the database is packed to reduce the storing space needed.

7. The method of claim 1, wherein the method comprises:
   acquiring several dynamic data alternatives for one tag;
   allowing the user to select one or more of said dynamic data alternatives; and
   combining the one or more dynamic data alternatives to the document at the tag.

8. The method of claim 1, wherein the method comprises:
   defining general properties and attributes of the document;
   selecting a document template; and
   formatting the document components according to the selected document template before or after including the document components in the document or during the including of document components in the document.

9. The method of claim 1, wherein the method comprises:
   allowing the user to add to the document content selected by the user.

10. The method of claim 9 wherein the method comprises:
    allowing the user to add to the document content selected by the user using an image or video taken by the user and/or audio signal recorded by the user.

11. The method of claim 9, wherein the method comprises adding the content selected by the user to the document as one or more supplementary components.

12. The method of claim 9, wherein the method comprises adding the content selected by the user to the document as one or more document components.

13. The method of claim 1, wherein the method comprises allowing adding of content to the document from files of one or more document types.

14. The method of claim 1, wherein the document comprises a unique identifier.

15. The method of claim 14, wherein the identifier comprises one or more of the following or any combination of any parts thereof: a barcode, a QR code, text, numbers, an alphanumerical identifier, an RDF identifier, a derivative of an biometric identifier of the user.

16. The method of claim 15, wherein the method comprises recognising or imaging notes made in the document; recognising the identifier of the document; and updating the document to comprise said notes.

17. The method of claim 1, wherein the method comprises forming more than one documents based on the subject selection of the document on creating the document.

18. The method of claim 17, wherein the method comprises forming at least one of the more than one documents being formed to include a document component or components deviating from the other documents being formed.

19. The method according to chain 1, further comprising protecting the combined acquired dynamic data in the document to avoid changes made by the user.

20. An apparatus comprising a memory, a computer program stored in the memory and a processor, wherein the processor is adapted, when executing the computer program, to execute the method according to claim 1.

* * * * *